(12) United States Patent
McCleary et al.

(10) Patent No.: US 8,756,230 B2
(45) Date of Patent: Jun. 17, 2014

(54) QUALITY VALIDATION METHOD

(75) Inventors: Ryan Thomas McCleary, Royal Oak, MI (US); Stanley James Patterson, IV, West Bloomfield, MI (US); Joshua Yates, Hazel Park, MI (US)

(73) Assignee: Atco Industries, Inc., Sterling Heights, MI (US)

( * ) Notice: Subject to any disclaimer, the term of this patent is extended or adjusted under 35 U.S.C. 154(b) by 862 days.

(21) Appl. No.: 12/345,749

(22) Filed: Dec. 30, 2008

(65) Prior Publication Data

US 2009/0169092 A1 Jul. 2, 2009

Related U.S. Application Data

(60) Provisional application No. 61/017,813, filed on Dec. 31, 2007.

(51) Int. Cl.
*G06F 17/30* (2006.01)
(52) U.S. Cl.
USPC .............................. 707/737; 702/82; 700/110
(58) Field of Classification Search
USPC .......................................... 700/110; 707/746
See application file for complete search history.

(56) References Cited

U.S. PATENT DOCUMENTS

| | | | |
|---|---|---|---|
| 4,961,148 A | 10/1990 | Holda et al. | |
| 5,461,570 A | 10/1995 | Wang et al. | |
| 5,877,961 A * | 3/1999 | Moore | 700/180 |
| 6,027,022 A | 2/2000 | Hong | |
| 6,115,643 A | 9/2000 | Stine et al. | |
| 6,188,402 B1 * | 2/2001 | Csipkes et al. | 715/705 |
| 6,539,271 B2 | 3/2003 | Lech et al. | |
| 6,614,050 B1 | 9/2003 | Yamada et al. | |
| 6,671,566 B2 * | 12/2003 | Honda | 700/83 |
| 6,750,884 B1 | 6/2004 | Steigerwald et al. | |
| 6,771,369 B2 | 8/2004 | Rzasa et al. | |
| 6,801,821 B2 | 10/2004 | Madden et al. | |
| 6,819,965 B2 | 11/2004 | Beatty et al. | |
| 6,892,104 B2 | 5/2005 | Patil et al. | |
| 6,909,927 B2 | 6/2005 | Nguyen | |
| 6,944,516 B1 * | 9/2005 | Collins et al. | 700/109 |

(Continued)

FOREIGN PATENT DOCUMENTS

EP 1675058 A2 6/2006

OTHER PUBLICATIONS

Johnson, L. (May 2007). Breakthrough Improvement for Your Inspection Process. In Six Sigma Forum Magazine (vol. 6, No. 3, pp. 22-27). ASQ.*

*Primary Examiner* — Hung Q Pham
*Assistant Examiner* — William Spieler
(74) *Attorney, Agent, or Firm* — Young, Basile, Hanlon & MacFarlane, P.C.

(57) ABSTRACT

A quality validation method to improve inspection and validation processes by increasing their quality, efficiency, and positive impact. This method automatically prompts operators at one or more validation stations to follow a validation path comprising one or more validation items configurable by part number. It allows for automatic or manual feedback on the result of each item checked, the ability to enforce a particular pack-out consist based upon user provided specifications, and the ability of historically storing inspection results comprising container, part and inspection item information and results. It additionally provides an easily accessible interface to configure validation items and areas by part number, configure validation paths comprising of a variable quantity and order of validation items, and obtain information in a variety of useful formats.

20 Claims, 6 Drawing Sheets

(56) References Cited

U.S. PATENT DOCUMENTS

| | | |
|---|---|---|
| 6,990,421 B2 | 1/2006 | Kato |
| 7,024,262 B2 | 4/2006 | Yokota et al. |
| 7,035,877 B2 | 4/2006 | Markham et al. |
| 7,340,319 B2 | 3/2008 | Hawman et al. |
| 2003/0019747 A1 | 1/2003 | Saffell et al. |
| 2003/0150909 A1 | 8/2003 | Markham et al. |
| 2005/0216152 A1 | 9/2005 | Tsubota et al. |
| 2005/0222703 A1* | 10/2005 | Hoppes et al. ............. 700/109 |
| 2006/0203230 A1 | 9/2006 | Ohminami et al. |
| 2006/0276923 A1 | 12/2006 | Popp |
| 2008/0188973 A1* | 8/2008 | Filev et al. ............. 700/110 |

* cited by examiner

QUALITY VALIDATION METHOD

CROSS-REFERENCE TO RELATED APPLICATION

This application claims priority from pending U.S. Provisional Application Ser. No. 61/017,813 filed Dec. 31, 2007, which is incorporated herein in its entirety by reference.

BACKGROUND

The historically used process of detecting product non-conformances is to first define the non-conformance to be detected, compose a written procedure to visually or otherwise detect the defined non-conformance, train operators on the written procedure, direct operators to execute the written procedure, and then manually record the total number of parts inspected and the total number of non-conformances detected. This process is highly labor intensive to set-up, especially when multiple part configurations and/or multiple non-conformance items are involved. The process is also vulnerable to operator training and performance when many process combinations for multiple part configurations and/or non-conformances must be retained and followed. The process also requires a measurable amount of labor to record data that, due to its manually recorded nature, is subject to low accuracy and limited visibility to engineers and decision makers.

Known systems and processes do not include a way to automatically display and facilitate a step-by-step validation process. For example, in known systems, the validation process is documented and facilitated using written procedures and paper or computerized data collection forms. In cases where multiple part configurations with varying composition of validation items must be inspected, the variations must be documented in multiple procedures. Rather than providing a way to automatically display each item of the required validation process in the order of execution for the current part configuration, current solutions require that inspection personnel retain the process information for every process performed or refer back to one of multiple procedures if the correct process is forgotten.

DRAWINGS

These and other features, aspects, and advantages of the present invention will become better understood with regard to the following description, appended claims, and accompanying drawings where:

DESCRIPTION

Definitions

Figure 1:
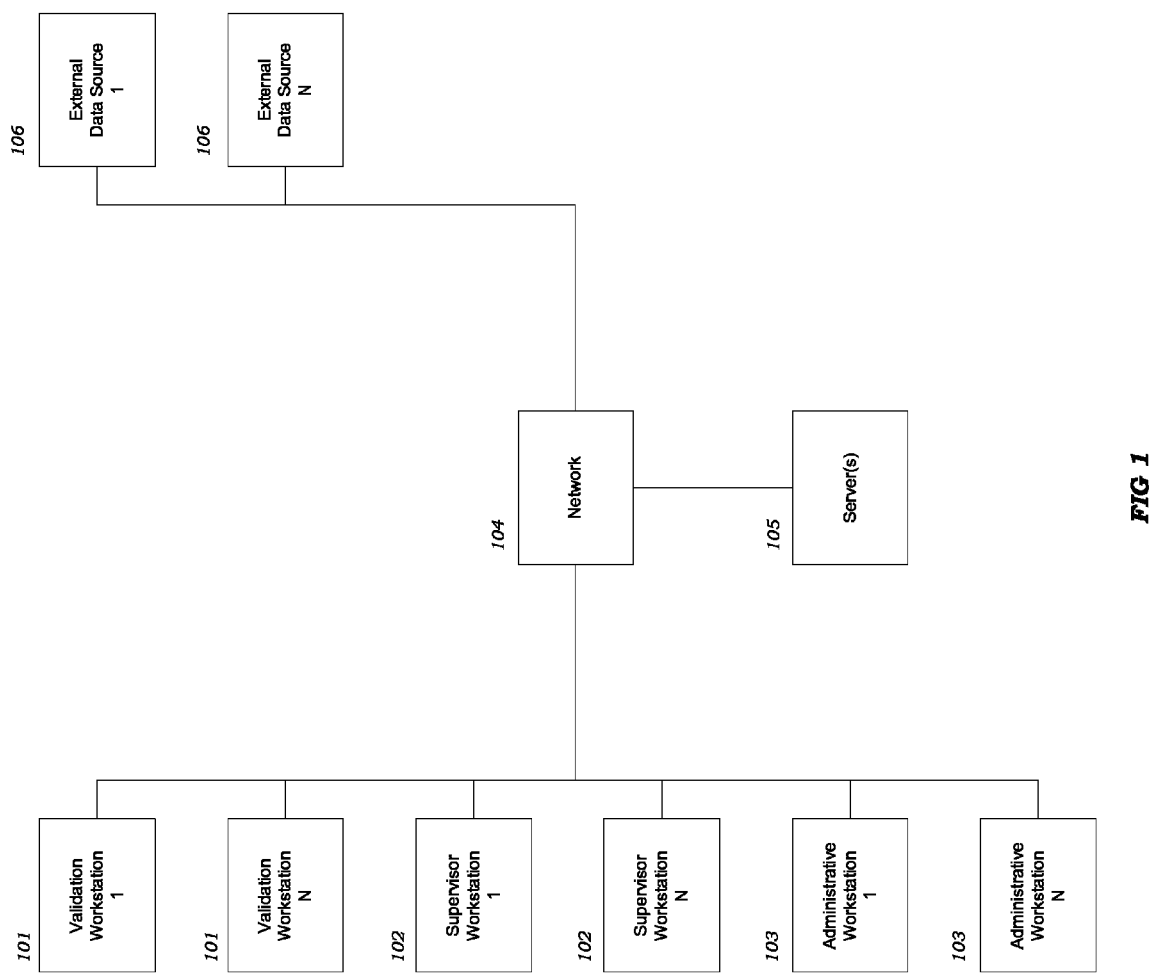
FIG. 1 shows the organization and networking of the various devices that is included in this embodiment of the invention.

Part: A tangible item that is manufactured or otherwise produced and has an associated specification or description of its characteristics. Each unique item specification is preferably identified by a unique part number. Each individual part is preferably identified by a unique identifier on the part, normally a serial number. Other means of identification could include combinations of date, production shift, assembly line/machine, and part number information.

Part Batch, Batch, Container: A grouping of parts. The inclusion of a part in a batch is preferably defined by the container in which the part is stored in for shipment. The batch is preferably identified by a unique identifier on the box, normally a serial number on an applied label.

Record: A single item of information. A record can be represented as a row in a relational database.

Validation: Determination of whether a part conforms or non-conforms to specific parts of its specification that are in question. Used interchangeably with the term Inspection.

Validation Area, Area: A grouping of validation items that are closely related, normally based upon item type or location. Areas are defined in order to reduce the number of responses required at the validation workstation.

Validation Cell, Cell: A validation cell is a grouping of validation stations that cooperate to perform the same validation path in a distributed manner. Each station is given a specific station number in order to ensure that the validation path order is followed correctly.

Validation Information: Data collected by the validation workstation determining the status of a particular validation item on a part. Validation information will at minimum include whether the item was conforming to the item specification or not. It may also include more detailed variable or attribute data related to the particular validation item and part.

Validation Item, Item: A specifically defined item on a part that must be validated. The item will typically focus on a specific feature or characteristic of the part that may be non-conforming. The item will include at minimum instructions and/or procedures for proper validation and a name for reference.

Validation Path, Path: A collection of validation items to be performed in a specific order. Each item will have an associated validation station specific to the validation path.

Validation Process, Validation Method: General descriptor of the validation workstation process. This process includes the identification and data input of batches and parts, the path of validation items, the actual validation of each item in order, and the storage of the validation information.

Validation Station, Station, Validation Workstation: Each validation workstation is uniquely identified and is given a specific station number within a validation cell. The station number is used in conjunction with the validation stations specified in the validation path to be used in order to display the proper validation items at each validation station.

Workstation: Entity at which specific functionality is provided and specific work is performed. A workstation may be implemented in many different ways, including client/server application, virtual terminal, and dynamic web page interfaces.

Overview

FIG. 1 shows the preferred structure of the current version of the invention, which is a computerized method of automating quality validation, primarily suited for a manufacturing environment. The implementation of this computerized method is referred to as the "system" herein. The system will comprise one each of a Validation workstation (101), Supervisor workstation (102), Administrative workstation (103), Network (104), and Server (105). There may be more than one of the above items included in the preferred structure, as determined by the requirements of the individual application of this version of the invention. Additionally, this version of the invention may comprise of one or more external data sources (106). Note that in the Overview and Detail sections, this version of the invention is described conceptually as a system architecture without regard to any specific computerized implementation, and should be correspondingly interpreted. An example implementation and description of expected use will follow to explain a potential mode of implementation.

The validation workstation is used to display validation processes and receive validation information about parts and corresponding part batches to and from production personnel. The validation workstation may alternately receive validation information automatically upon request to an external data source connected to the network, or alternately automatically through a device connected directly to the validation workstation. The validation workstation receives validation process information through the network from the server upon request by the validation workstation. The validation station may also be used to automatically display current and historical quality, productivity, production requirement, and other information as required by the environment. Access to the validation workstation and ability to enter validation information is controlled by an authentication mechanism connected to an employee database comprising employee identifier and passcode information.

The supervisor workstation is used to manage daily operation of the validation workstations by production supervisory personnel. Such management primarily comprises of display and modification of part validation records and batch contents and status records, and is controlled by the server through the network. The provided functionality would be utilized to determine current status of the system and to rectify incorrectly provided validation information and to correct parts incorrectly associated with a batch. The station may also be used to create, maintain, and inactivate employee records to properly control access to the validation workstations.

The administrative workstation is used to manage the validation process and access reports, and is controlled by the server through the network. The administrative workstation comprises the functionality of viewing, editing, and inactivating validation paths, items, areas, parts, stations, cells, and employee records. Access to the administrative workstation is limited using an authentication scheme, and access to specific information is further limited by employee role. Employee authentication and roles are controlled through the employee record by management personnel. Additionally, the administrative workstation can be used to generate reports from the data collected from the validation workstations. Pre defined reports could include raw data (with no calculations or formatting performed), inspection reports (which could include pareto, PPM, and paynter chart analysis), production reports (which could include quantity of good parts produced compared with the quantity of parts required), and efficiency reports (which could include an analysis of expected cycle and idle times versus actual cycle and idle times).

The network connects all workstation(s), server(s), and external data source(s) so that data and commands may be passed between them.

The server(s) are the central point of the system where all data is stored, and from which all high level functions are controlled from. Lower level functions, such as the individual steps required to immediately control the validation process. Validation workstations receive validation process information from and send validation information to the server(s). Supervisor workstations receive status information from and send required modifications to the server(s). Administrative workstations receive current configuration and current or historical reporting information from the server(s) and send required configuration updates to the servers.

The external data source(s) are databases and other stores of information available through the network that are populated by machines and programs outside of the validation system. Examples of such data sources include test data from functional test machines, and process monitoring information from manufacturing devices, which could include torque controllers, adhesive applicators, and forming machines. This external data is used by the validation workstation to supplant validation information collected manually by the validation workstations or by the server to supplant or augment validation information supplied by the validation workstation.

Details—Data Structure

Figure 2:
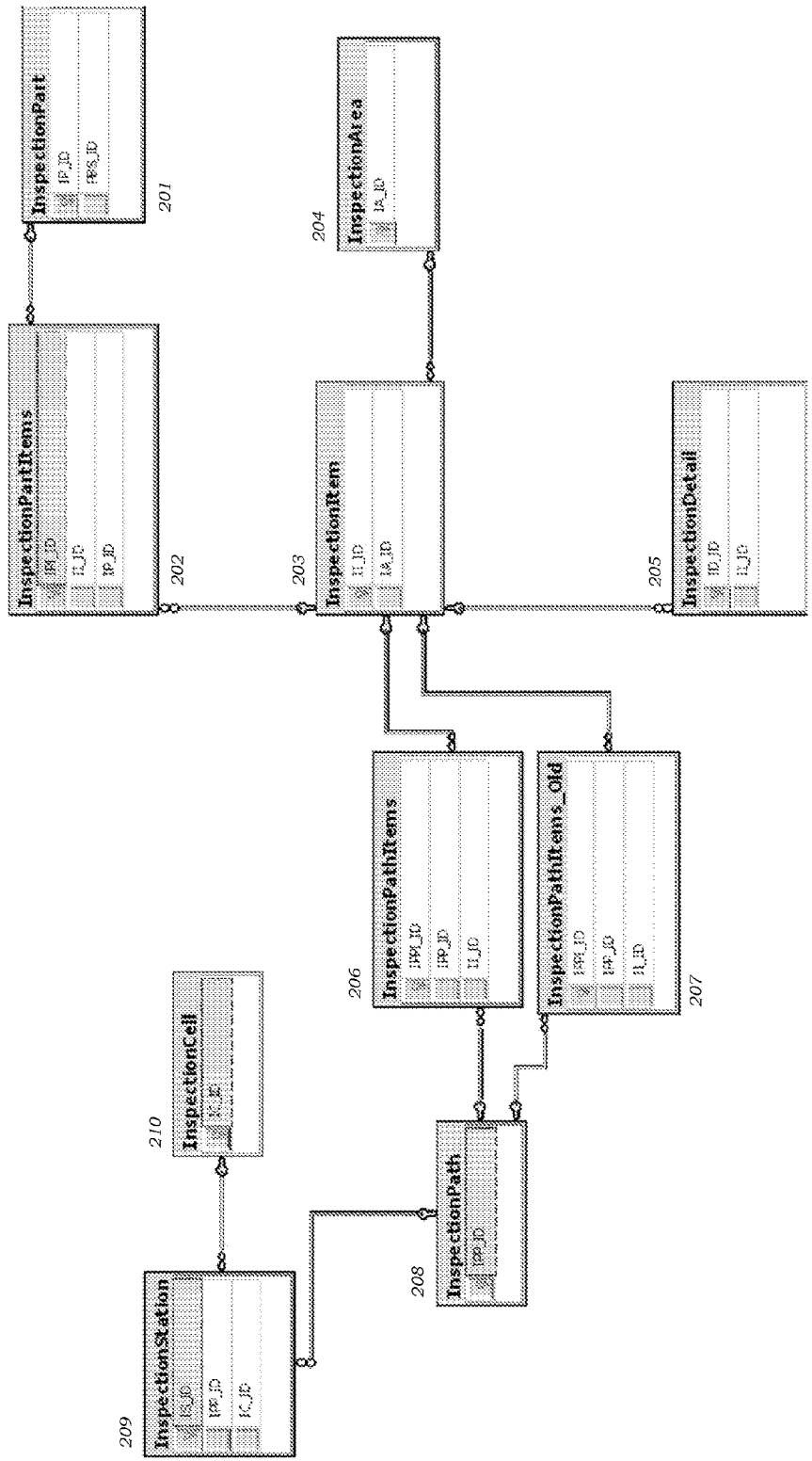
FIG. 2 shows the configuration section of the database structure that is included in this embodiment of the invention.
Figure 3:
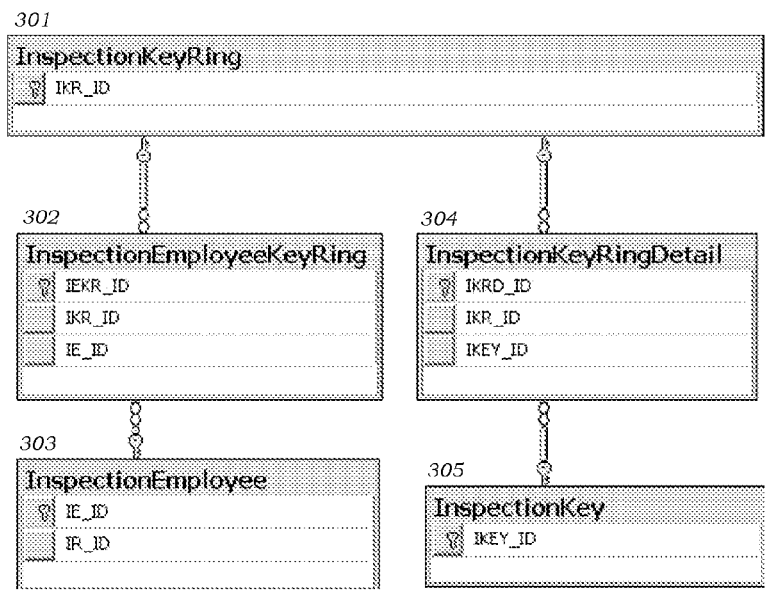
FIG. 3 shows the employee and security section of the database structure that is included in the preferred embodiment of the invention.
Figure 4:
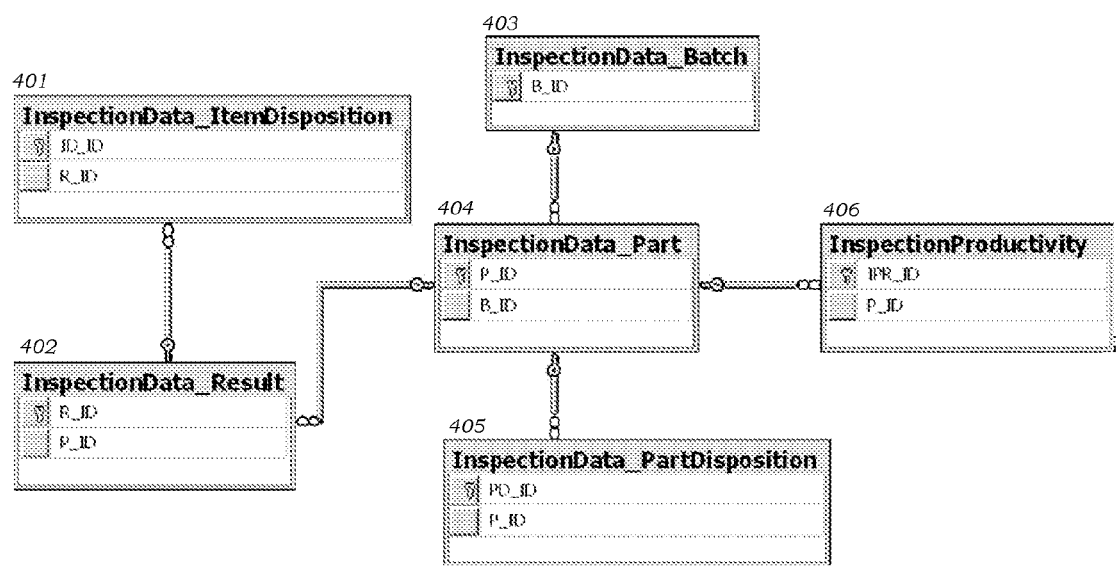
FIG. 4 shows the data section of the database structure that is included in this embodiment of the invention.

FIG. 2 shows the data structure for storage of the configuration values used to control the automatic validation process. FIG. 3 shows the data structure for storage of the employee authentication information used to control access to the various workstations and information available from the system. FIG. 4 shows the data structure used to store all validation information collected by the system for later retrieval and reporting. This data is stored on the server and can be accessed and modified by the various workstations in various ways depending on implementation, an example of which is disclosed later on in the Example Implementation. The purpose of this section is to disclose only how data will be stored in order to facilitate the automated validation method disclosed in the next section. The data structure is shown with distinct tables for each specific type of information, including key identifiers and key links to other data. The data structure does not include other ancillary data that is required, as most will vary by application and environment. Example ancillary data fields will be disclosed as the data structure is explained, but should not be considered to be comprehensive. The data structure table and field names used are intended to be representative only, and are used only for illustrative purposes.

With regards to FIG. 2, the first table is the InspectionPart table (201). This table is used to store a record for each part that will be validated by the system. The IP_ID is a unique identifier for each part, is automatically generated, and is used to refer to the part throughout the system. The PBS_ID is an identifier referencing a part barcode specification definition defined in a linked table that will be used to interpret data input identifying each unique part. Generally such information will comprise of a part serial number, part number, date, shift, or assembly line. The barcode specification may refer to one or more barcodes, as a part may include more than one (one may identify the part number; another may uniquely identify the part through a serial number). Information that could for example be included in the InspectionPart table would be one or more part numbers, part name, part description, color, and standard pack size (number of parts per shipping container).

Next is the InspectionItem table (203). This table is central to the entire validation system, and is used to store each validation item that used within the system. The II_ID is a unique identifier for each item, is automatically generated, and is used to reference the item throughout the system. The IA_ID is an identifier that links each item to one area, which is described below. Other information stored in this table could comprise item name, description, process instructions, effective date, and ending date.

The next table is the InspectionPartItems table (202). It is linked to the InspectionPart table (201) by a many to one relationship. It is linked to the InspectionItem table by a many to one relationship. The purpose of this table is to allow many InspectionItem records to be linked to many InspectionPart records. This is necessary to allow a single item to be associated with many parts (for example, when a group of parts may share the same characteristic), and a single part to be associated with many items (to validate all the required characteristics on the part). The IPI_ID is a unique identifier for each item to part link, is automatically generated, and is used to reference the item to part link throughout the system.

The InspectionDetail table (205) is linked to the InspectionItem table in a many to one relationship. The InspectionDetail table contains records defining additional categories for each InspectionItem beyond conforming or non-conforming. A detail record will typically comprise of a name and description and will describe the type or category of non-conformance found when validating an item. The ID_ID is a unique identifier for each detail record, is automatically generated, and is used to refer to the detail record throughout the system.

The InspectionArea table (204) is linked to the InspectionItem table in a one to many relationship. The InspectionArea table contains records of all Validation Areas (defined above) in the system. Each item is linked to one area, and one area can contain an indefinite number of items. The IA_ID is a unique identifier for each area, is automatically generated, and is used to refer to the area throughout the system.

The InspectionPath table (208) contains all of the Validation Path (defined above) records in the system. The IPP_ID is a unique identifier for each path, is automatically generated, and is used to refer to the path throughout the system. A record will typically comprise of the name and description of the path.

The InspectionPathItems table (206) links item records to various path records. This is a many to many relationship as an item may be included in multiple paths. The IPPI_ID is a unique identifier for each path to item link, is automatically generated, and is used to refer to the path to item link throughout the system. A record will typically comprise of the station number that the item will be validated at, an index number specifying the order that the items will be validated in, and the date the item became effective in the path. The InspectionPathItems_Old table (207) contains the same information as the regular InspectionPathItems table, except it is for obsolete links between path records and item records. Typically, this will occur when a path is modified by an administrative workstation or when an item is modified or inactivated. The preferable means of modifying an item is to inactivate the current item record and to create a new record and link to the path. Accordingly, any change made to path content or to the individual item will be archived for future reference and reporting.

The InspectionStation table (209) contains information for each validation workstation (defined above) within the system. The IS_ID is a unique identifier for each station, is automatically generated, and is used to refer to the station throughout the system. A record will typically comprise of name, description, workstation implementation information (computer name, IP address), and station number (to be used with the station numbers defined in the path). The InspectionStation table has a many to one relationship with the InspectionPath table. Accordingly, each station is associated with one and only one validation path.

The InspectionCell table (210) contains information on each validation cell (defined above) within the system. The IC_ID is a unique identifier for each cell, is automatically generated, and is used to refer to the cell throughout the system. A record will typically comprise of name and description. The InspectionCell table has a one to many relationship with the InspectionStation table. Accordingly, each station is associated with one and only one cell.

FIG. 3 shows the preferable means of storing employee authentication information in three primary tables: InspectionKeyRing (301), Inspection Employee (303), and Inspection Key (305). The Inspection Key table is used to identify each area of the system that requires different authentication criteria and contains key records. The IKEY_ID is a unique identifier for each key, is automatically generated, and is used to refer to the key throughout the system. The InspectionKeyRing table contains records used to identify collections of key records that can be associated with individual employee records for access control. A key ring can represent one of many access levels and would typically include: administrator, configuration editor, reporting access, supervisor (for access to supervisor workstations), and validator (for access to validation workstations). The IKR_ID is a unique identifier for each key ring, is automatically generated, and is used to refer to the key ring throughout the system. The InspectionEmployee table contains records used to identify individual employees and store their access (ID and passcode) information. The IE_ID is a unique identifier for each employee, is automatically generated, and is used to refer to the employee throughout the system. Additional information associated with each employee record would likely include name, contact information, authentication ID and passcode, and picture.

The main authentication tables are linked together using two additional tables: InspectionEmployeeKeyRing (302) and InspectionKeyRingDetail (304). The InspectionEmployeeKeyRing table creates a many to many relationship between employee and key ring records, allowing employee records to be associated with multiple key ring records and key ring records to be associated with multiple employee records. The InspectionKeyRingDetail table creates a many to many relationship between key and key ring records, allowing any number of key ring records to be associated with any number of key records.

The authentication data structure is intended for use as follows: Many key records will be generated when the system is implemented, and will be used by individual sections of the system to control access to information and functionality (based upon whether the authenticated employee record has been associated with the key or not). In order to simplify administration of the system, a smaller number of key ring records will be created (examples disclosed above), and associated with the appropriate key records to create "groups" of access. Individual employee records will be associated with specific key ring records (and consequently associated with individual key records) based upon business requirements as needed from the administrative workstation.

FIG. 4 shows the means for storing received validation information for future retrieval and analysis. The central table in the storage scheme is the InspectionData_Part (404) table. This table contains part records for every unique part validated by the system. The P_ID is a unique identifier for each unique part, is automatically generated, and is used to refer to the unique part throughout the system. The table will preferably include additional data such as current validation result, identification (normally the barcode(s) scanned to identify the part), and status. The status field will be utilized to identify whether the part record is active or inactive, to allow for a specific unique part to be validated more than once (for example, in the case of rework or repair). If the need for subsequent validation is indicated, the part record will be marked as status inactive, and a new status active record will be created when the part is next validated. Only one part record per unique part identification is permitted for status active part records. These rules permit the ability to retain records of all validation information, and to also clearly indicate which validation is active and should be used for reporting and analysis purposes. Whenever a part record is marked inactive or if some other comment must be made about a result record, an entry will be made in the InspectionData_PartDisposition (405) table as a disposition record. The PD_ID is a unique identifier for each disposition record, is automatically generated, and is used to refer to the disposition record throughout the system. This table will preferably contain the IE_ID of the employee creating the record, along with date and time, and the comment made.

Associated with the InspectionData_Part table in an optional many to one relationship is the InspectionData_Batch (403) table. This table is used to store batch records to identify containers that unique parts will be put in to. The link is optional because the system may be used with or without the feature associating validated unique parts with the part's eventual container. The B_ID is a unique identifier for each batch, is automatically generated, and is used to refer to the batch throughout the system. The table will preferably include additional data such as container label information (part number, quantity, serial number, and lot number) and status. The part number and quantity fields will be used to ensure referential integrity in the link to part records, so that the batch record is associated only with part records that has the part number it is required to have, and that the batch record is only associated with the quantity of parts that it is required to have. The serial number field will preferably be unique, preventing physical containers from being used more than one time.

Associated with the InspectionData_Part table in a many to one relationship is the InspectionData_Result (402) table. This table is used to store all validation item result records. The R_ID is a unique identifier for each result, is automatically generated, and is used to refer to the result throughout the system. This table will preferably include additional data such as result (conforming or non-conforming), date and time, IE_ID of the validating employee, and a status field. As with the InspectionData_Part table, the status field will be used to mark whether a result record is active or inactive. A result record may be marked inactive in cases such as when a validation was recorded incorrectly, or if the non-conformance found has since been rectified. In that situation, the initial result record would be marked inactive and a new record would be created with the new information, preserving the initial result for future analysis if required. Every time a result record is marked inactive or if some other comment must be made about a result record, an entry will be made in the InspectionData_ItemDisposition (401) table as a disposition record. The ID_ID is a unique identifier for each disposition record, is automatically generated, and is used to refer to the disposition record throughout the system. This table will preferably contain the IE_ID of the employee creating the record, along with date and time, and the comment made. Additionally, if the InspectionDetail (205) table is used to define details of the validation information, an additional table would be required to link to the InspectionData_Result table, storing all detail records associated with each non-conforming result record.

The last table associated with InspectionData_Part in a many to one relationship is the InspectionProductivity (406) table. This table is used to store all productivity and efficiency information about each part validated, segmented by the stations that the validations are completed at. The IPR_ID is a unique identifier for each productivity record, is automatically generated, and is used to refer to the productivity record throughout the system. The table will preferably include the start and end time of validation, station number of the productivity record, idle time between the last validation and the current validation, and the IE_ID of the employee performing the validation. This information structure will facilitate reporting and analysis designed to understand and to improve productivity and work flow.

In conclusion, the data structure described above is the framework that can be used to facilitate and control the validation method described in detail next.

Details—Validation Method

Figure 5:
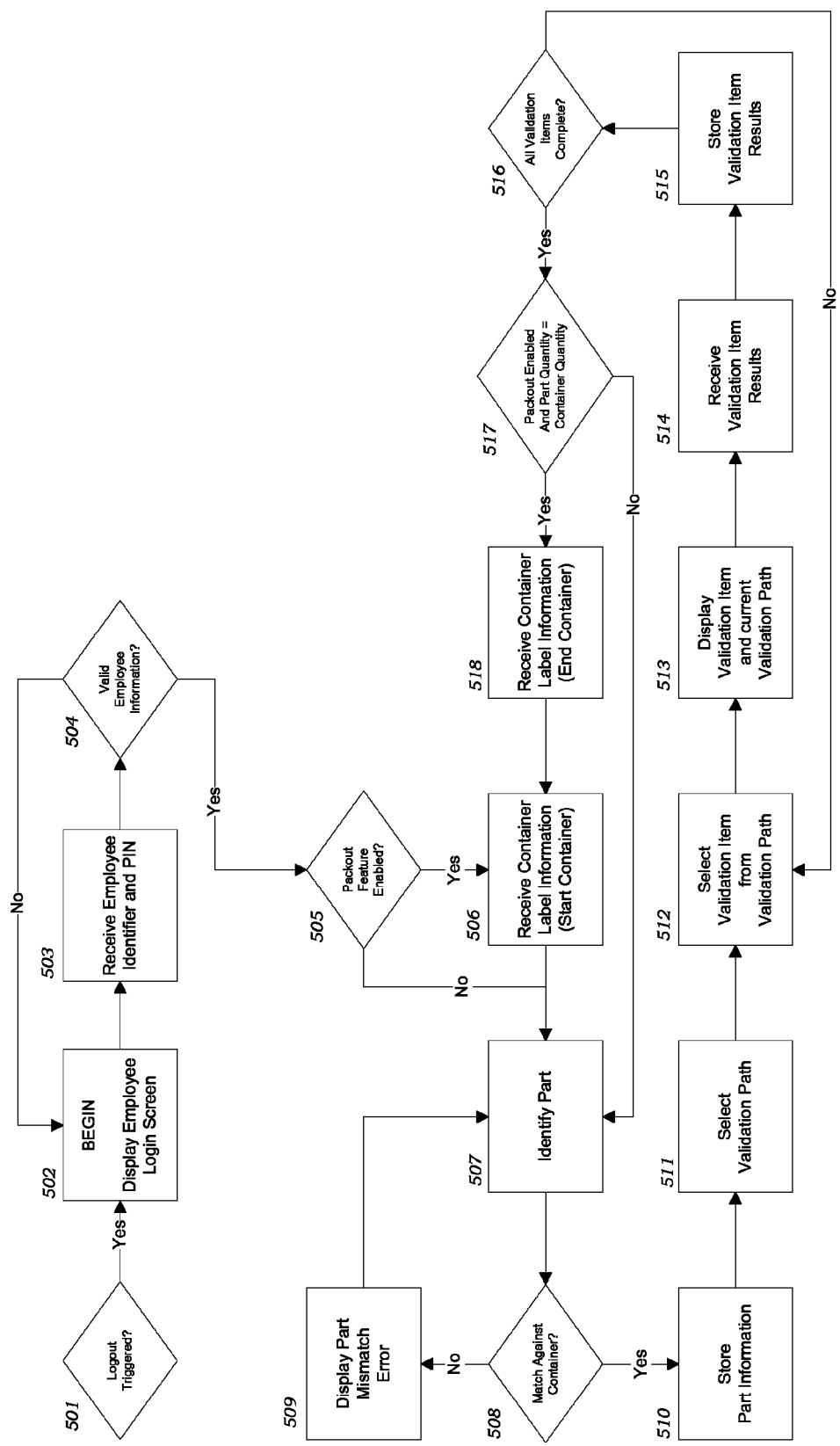
FIG. 5 shows the process flow of the basic underlying method of the invention.

FIG. 5 describes the validation method that is core to the present version of the invention. It shows in standard flowchart format each individual step required to automatically facilitate the validation or inspection process. This method operates on the validation workstation described above, of which many steps are supported by other portions of the system. Follows is a detailed description of the operation of each portion of the method shown.

The first segment of the validation method describes the identification of the employee that will be performing the validation process. The process begins at 502, at which a logon prompt is displayed to the employee at the validation workstation. The employee will respond with his/her identification number (which preferably would be in the form of a computer readable barcode, and would be automatically read by the workstation) and passcode. The information will be received by the workstation as shown in 503, and will be transmitted to the server(s) for authentication. Either the server or the workstation will perform analysis as shown in 504 to determine whether the identification and passcode match an existing employee in the system, and if so, whether or not the employee record has the proper key record associated for access to the validation workstation. If either test fails, the process will return to 502, displaying the login prompt along with a message indicating the error encountered. If both tests pass, the process will continue to 505, the beginning of the core validation process. An employee "logout" (501) requiring display of the login prompt and reprocessing of steps 502, 503, and 504 may be triggered at any point in the following process. The criteria for such a trigger is implementation specific, and may be caused by inactivity for a period of time, end of shift, or manually by the employee.

The beginning of the core process is at 505 where the workstation determines whether the packout feature is enabled. This feature refers to the batch data structure (403) defined above which allows parts processed through the validation process to be associated with a specific container. This is an optional feature, and will be enabled or disabled preferably in the workstation station record stored in 209. The workstation will transmit a request for this information to the server to determine whether the feature is enabled. If the feature is enabled, the process continues to 506, where container information is received. Otherwise, the process will continue to step 507. In step 506, a screen will prompt for container information, which may vary based upon implementation. Typically, part number, quantity, and serial number will be prompted for twice, as there are normally two container labels on each container with duplicate information. The duplicate entry allows for validation that the information was entered in properly and that the container labels match. Once received and validated, the container information will be transmitted to the server to create a new batch record. Alternatively, at the beginning of step 505, the workstation may transmit to the server a request to determine if the present station had completed the previous batch (container) that it was filling previous to the present login process. If so (the last batch processed is not complete, signifying that the container quantity has not been reached), the workstation may use that previous batch instead of creating a new batch record through the server. Once the batch record to be used has either been created or identified, the process moves to step 507, part identification.

In step 507, the workstation prompts for part identification. The format of the part identification will vary by implementation, and is preferably defined by the part barcode specification described in data structure 201. Preferably, the part identification will be stored in an automatically readable format, and will be read by the workstation and analyzed either by the server or workstation. In step 508, the analyzed information will be used to determine if the identified part number matches the container part number if the packout feature is enabled as described in 505. If the part number does not match, an error will be displayed prompting the employee to use a different part (509), and the process will return to 507 to identify the next part presented for validation. Otherwise, if the part numbers do match, or the packout feature is not enabled, then the process will move to step 510, where the part identification will be transmitted to the server for further validation and storage. The server will determine if the part identified is already stored in the system with a status of active (data structure 404), and if so, will return that part record to the workstation. Otherwise, a new part record will be generated and returned to the workstation.

Once the part record is generated, the workstation will transmit to the server the part record to enable the server to select the required validation path (511) to be used which will include all items (203), areas (204), and details (205) required to validate the part. The list of items is filtered to those item records that are associated with the InspectionPart (201) record that matches the part record (404) generated from the part identification information. The validation path (208) used is determined based upon the path record that is associated with the station record (209) for the current validation workstation. If the part record was a previously generated active record, any existing validation results may be added to each item in order to avoid revalidation. Once the filtered list of path items has been generated, it will be transmitted to the workstation from the server. As a part of this process, either the workstation or server may optionally validate, based upon implementation requirements, that all required validations have been completed and determined to be conforming at all previous stations in the validation path before moving forward. If it is determined that a previous validation item has not been completed or has been determined to be non-conforming, then the process can be transferred back to step 507 to identify another part, after displaying a corresponding error message.

Next, as shown in 512, the first non-validated item (as marked previously in step 511 or later in step 515) for the current station will be selected based upon the order provided by the server. As shown in 513, the validation workstation will then display the selected validation item, including a conforming picture, non-conforming picture, and item validation instructions. Alternatively, if there is multiple validation items associated with the present validation area of the present validation item, multiple items may be displayed at once in order to more efficiently complete the validation process for the area. In addition to the specific information for the current inspection item, summary information about all inspection items will be displayed, including item name, validation result, and station the validation is performed at. Additional information may be displayed including average cycle time for each validation, target cycle time for each validation, and total non-conforming results within a defined time period.

Based upon the information provided in step 513, the employee will be prompted for and will provide the results of the validation of the area or specific item in step 514. This will typically involve a determination of whether the part conforms or does not conform based upon the instructions and pictures shown. Additionally, more detailed information may be provided including variable data or selection of categorized result details defined in 205. Alternatively, if specified by the validation item, validation may be automatically completed through a specified external data source (106). If specified, either the workstation or server will automatically transmit a query to the external data source containing part identification, and either the external data source or the workstation/server will analyze the data available to determine if the part conforms, non-conforms, or it is unknown whether it conforms to the present validation item. If the part is determined to conform or not conform, the result will typically be entered without any need or ability for the employee to alter or confirm. If an unknown result is found (due to non-existence or a network or data source failure), the workstation may prompt the employee to validate the item manually or prompt the employee to try starting the validation process over for the part by transferring the process to step 507.

Once the validation result for the item has been received, regardless of source, it will be transmitted to the server for additional analysis and storage (515). Typically the server will simply store the data into the structure defined in 402, although it will typically process the data in such a way to distinguish between manual (employee) and automatic (external data source) validations. If the validation determines the part to be non-conforming, then the workstation will typically display to the employee that the part has been marked as non-conforming, to quarantine the part, and will transition to step 507 to prompt for the next part. Alternately, depending on implementation requirements, the process may continue until all items on the path have been completed, and then a message would be displayed and the process would transition to step 507.

After the selected item result is stored, either the workstation or server will determine whether all validation items to be performed on the current station have been completed. If so, the process will move to step 517. Otherwise, the process will go back to step 512 to select the next item to be validated in the path.

In step 517, if the packout feature is not enabled or if the total quantity of parts validated as conforming under the current batch have not reached the quantity required for the batch, the process will move to 507. Otherwise, if the batch has completed with the total quantity of parts validated as conforming matching the total quantity of parts required by the batch, the process will move to step 518.

In step 518, the workstation will prompt for container label information in order to validate that the batch has been properly completed and that all parts have been put into the correct container. Typically information required would include scans of part number, quantity, and serial number or just a serial number could be required (to improve efficiency). This information will be validated against the container information received at the beginning of the batch, and if the information matches, the batch will be marked as completed by the server, and the process will move to the beginning core step 506. Otherwise, the workstation will display an error and prompt for correct information.

In closing, the above section has described in detail the validation method at the core of the present version of the invention. The method utilizes the data structures defined previously to store data and control the process. Next, an example implementation will be described, which will include examples of the administrative and supervisory workstations that can be utilized to manage the above method.

Example Implementation of the Invention

The current version of the invention would typically be implemented using modern personal computers running a modern operating system such as Windows or Linux, fault-redundant servers running Windows or Linux, and Ethernet networking. Typically, the workstation interfaces would be using personal computers with LCD display. Workstations would preferably be equipped with automated barcode reading devices in order to more accurately and quickly identify parts and containers within the process. Responses from employees (workstation users) will be captured using standard keyboard, mouse, and keypad input devices. The keypad input device would preferably be color coded to more easily indicate functionality of various keys (whether to indicate conformity, non-conformity, manual logout, or other functions).

The validation workstation application would preferably be implemented as a client application with communication to the server via a web service application on the server over the Ethernet network. The web service application on the server will act as the "middle tier" between the client and the data store, performing validation and intermediate data analysis. The data structure would be implemented in a modern relational database server, such as SQL Server or Oracle. The external data sources would likely be located on personal computers or servers and would be stored in a variety of database formats, most notably text based or flat file relational database files. The external data sources would preferably be accessed through an intermediate web service which would access and translate the available data into a common format for use by the validation system.

Figure 7:
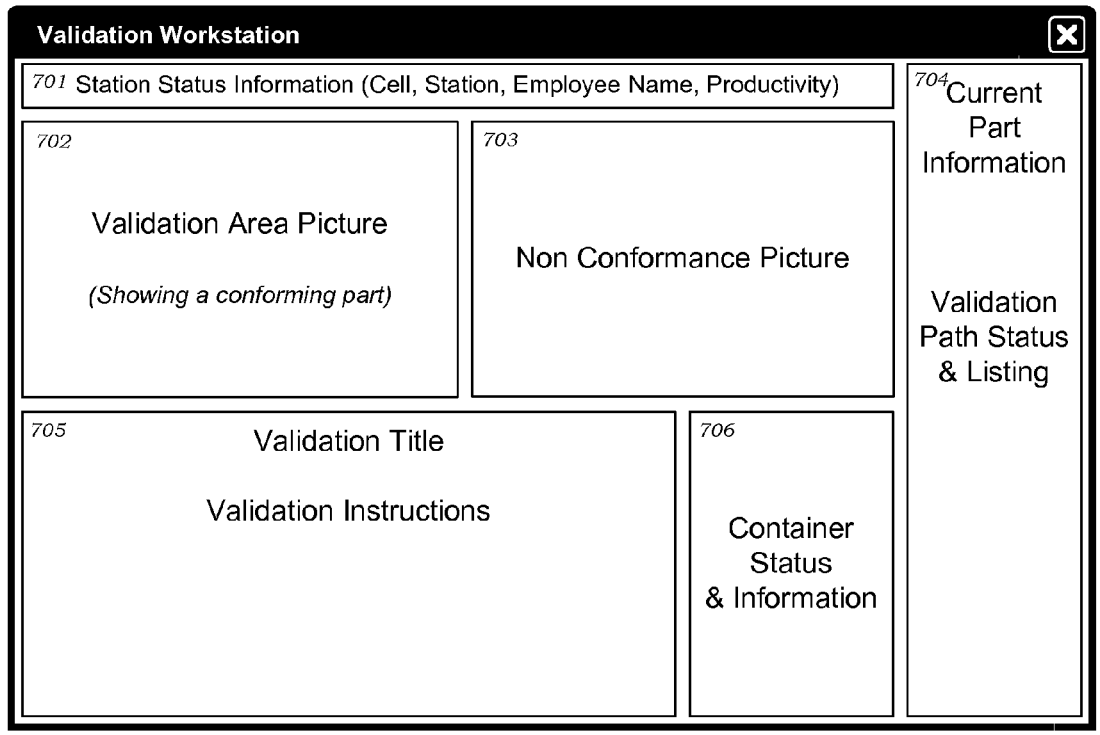
FIG. 7 depicts the validation workstation screen used in the current embodiment of the invention.
Figure 8:
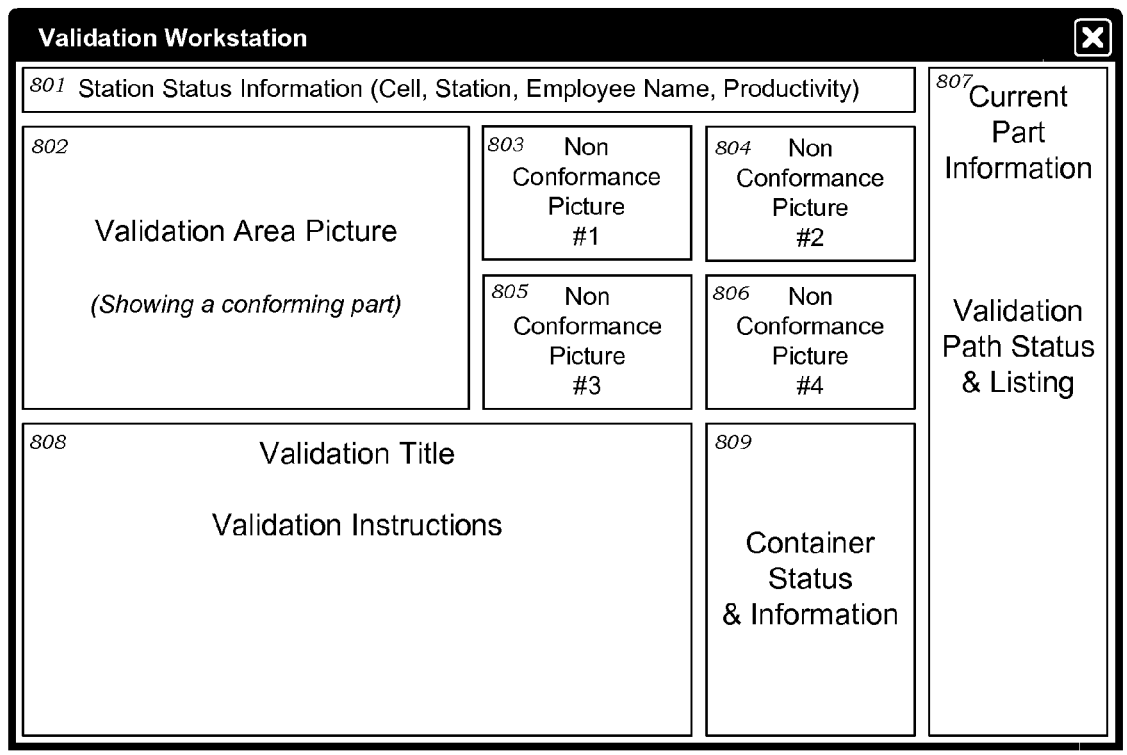
FIG. 8 depicts the validation workstation screen modified to take advantage of the validation area method used in the current embodiment of the invention.
Figure 9:
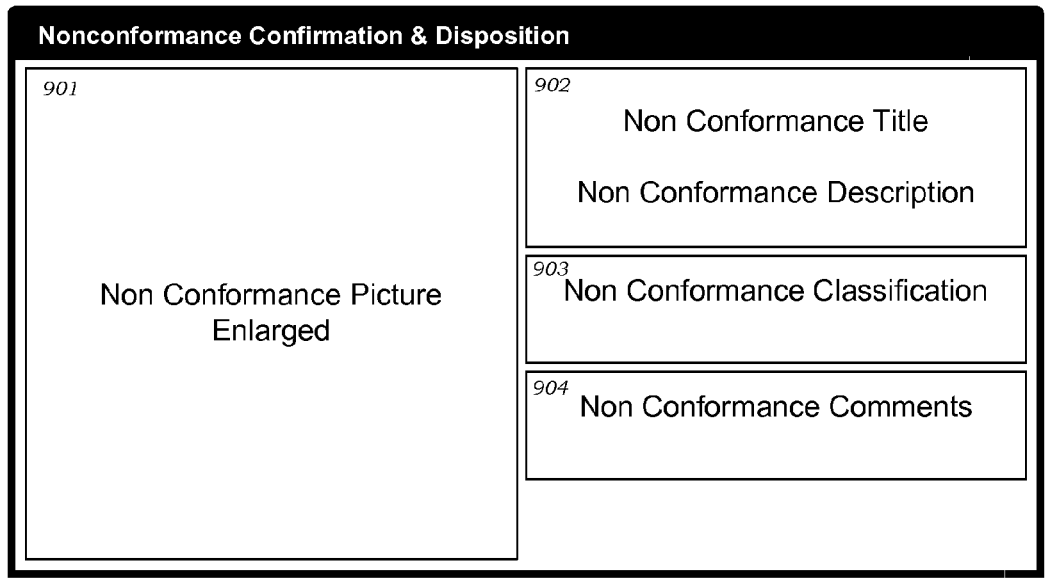
FIG. 9 depicts the non conformance confirmation and disposition screen utilized to confirm and further classify a non conforming part.

Example implementation of validation workstation client application screens are shown in FIGS. 7, 8, and 9. FIG. 7 shows an example client screen displaying validation path and item information to the employee. Area 701 on the figure is where general validation workstation information is displayed, including cell number, station number, employee name, and any productivity information displayed from the data stored in 406. Area 702 and 703 are where a conforming and non-conforming pictures are displayed, providing a reference for the employee when carrying out the validation instructions, which is displayed in area 705. Area 704 contains a list of all validations required to be performed for the current validation path and unique part. In addition to displaying the name of each validation item, the station number of each item, and results of validation (or lack thereof) will be displayed. In addition, the average cycle time for each item and historical non-conformance numbers may also be displayed in this area. At the top of the area, the current unique part that is being validated is shown, with its identifying information. Area 706 displays the current container/batch information for stations that have the packout feature enabled. This area will display the current container identifying information (normally part number, quantity, and serial number. It will also display a listing of all unique parts currently associated with the current batch, along with the current validation status (conforming, non-conforming, not complete) of each unique part and the remaining number of validation items yet to be performed on each unique part. All areas of the figure except for 701 are updated every time the selected validation item is changed at step 511 of the validation method. This transition would typically take place after the employee, through use of the provided keypad or other input device, responded to the validation item indicating whether the part conforms or non-conforms to the instructions provided. Area 701 is updated when the client application is started and when employee login or logout is completed (501, 504).

Another example validation workstation client application layout is shown in FIGS. 8 and 9. FIG. 8 is an alternate implementation of the validation screen shown in FIG. 7, with the added use of the validation area data structure. Areas 801, 807, and 809 correspond exactly to the descriptions of 701, 704, and 706 above. Area 802 corresponds to 702, with the exception that the conforming picture in this implementation now corresponds to the entire validation area and applies to all of the validation items within that area. Areas 803, 804, 805, and 806 correspond to 703, and instead of displaying one non-conformance image, displays four non-conformance images. The numbered non-conformance pictures are matched by numbered validation instructions listed in area 808. This example requires different responses from the employee than the implementation shown in FIG. 7. Instead of responding whether the item is conforming or non-conforming, the employee must respond whether all validation items displayed (the four potential non-conforming pictures and instructions) conform, or if one or more potentially non-conform, which one is potentially non-conforming. If all of the shown validation items are responded as conforming, then the same items are updated as in FIG. 7, and the client will store all items as conforming and will move onto the next validation area as shown in 516 and 512. If one of the items is indicated to be potentially non conforming, the screen shown in FIG. 9 will be displayed.

The screen in FIG. 9 is used to display more detailed information regarding the potential non-conforming validation item found on the unique part being validated. Area 901 is used to display an enlarged version of the validation item non-conforming picture, which along with the instructions given in area 902 will give all the information required to determine if the unique part is actually non-conforming for the present validation item. If the employee determines that the unique part is indeed non-conforming, then areas 903 and 904 are used to further classify the non-conformance (using detail records defined in 205) and to make written comments about the non-conformance for later review. After filling out areas 903 and 904 when applicable, the employee will press a key on the supplied keypad to enter the validation item as non-conforming. Subsequently, depending on the specific implementation of step 515, FIG. 8 will be redisplayed with the validation item marked non-conforming with the ability for the employee to validate the rest of the validation items for the part, or FIG. 8 will be redisplayed, and will prompt the employee to scan the next part and to quarantine the present non-conforming part.

Figure 6:
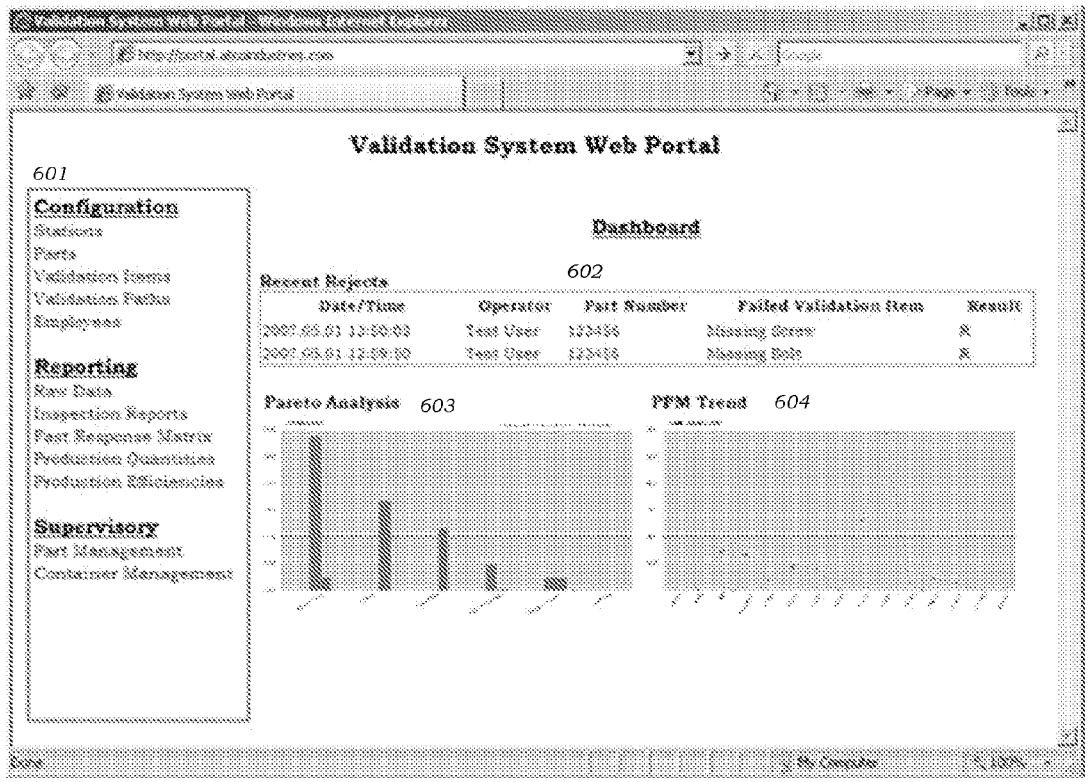
FIG. 6 depicts the web portal main screen used in the current embodiment of the invention.

FIG. 6 shows an example implementation of a dynamic web page application encompassing the functionality required for the supervisory and administrative workstations. Shown is the initial page of the application, though certain important subpages of the example implementation will be disclosed in more detail as well. Section 601 of the figure shows an example menu of options that would be displayed to the user. The main sections of functionality within the application are for configuration, reporting, and supervisory. Employee access to these various functions will be controlled based upon access granted as disclosed in FIG. 3. The configuration subpages linked to in section 601 are used to create and manage the validation paths, items, parts, and other ancillary information from an administrative workstation as discussed previously. The reporting subpages are used to access raw validation information as well as specifically created reports detailing quality, productivity, and production metrics. The supervisory subpages are to view system status information and to make updates to validation batches and unique parts when required to correct mistakes. The configuration and reporting sections comprise the functionality previously described for the administrative workstation. The supervisory section comprises the functionality previously described for the supervisory workstation. As defined above, these workstations are conceptual entities used to more easily understand the validation system. In this example implementation, any computer granted access to this web application over the network would potentially be able to function as either an administrative or supervisory workstation.

Section 602 shows an example of a summary report that would appear on the main page, which would detail the most recent non-conformances found at all of the validation workstations, and would be updated and created in real-time. Other real-time reports can be added to the main screen based upon implementation requirements. Section 603 shows a pareto analysis graph, which plots the quantity of occurrences of the most prevalent non-conforming validation items. The pareto graph is a standard quality tool used to identify the most prevalent quality concerns. The pareto principle states that "80% of the effects come from 20% of the causes". This pareto analysis graph is generated automatically in real-time based upon non-conformance validation information received from the validation workstations. Section 604 shows a PPM trend analysis chart, which plots the number of non-occurrences per million validations. The PPM trend analysis chart is a standard quality tool used to track current quality performance. This PPM trend chart is generated automatically in real-time based upon total validations performed and non-conformance information over time.

In closing, the above section has disclosed a example computerized implementation of the present version of the invention. The next section will disclose known uses and advantages of the present invention over current known methods.

Usage and Advantages

The potential utilization of the present invention can be subdivided based upon general process and location criteria. The validation method can be subdivided in two distinct process types: continuous and packout. The types are defined based upon whether the packout feature is enabled during the process, defined at 505. The first process type is packout, and is used when the validation method is used to keep track of validation and the containers that validated parts are packed into. There are three primary areas of use for the packout process: end of line, third party, and offline inspection.

The first area of use is at manufacturing end of line. In this use, the validation workstation(s) are placed after the manufacturing process is completed. The validation path is created with items derived from known product non-conformances or potential product non-conformances that are desired not to reach the end customer of the product. In this situation, the packout process would be utilized in order to ensure that the proper quantity and part number of validated conforming product is packed in containers for shipment to customers. In addition, the packout process would prevent non-conforming part from inadvertently being packed into the container undetected by keeping track of the total quantity of conforming parts packed into the container.

The specific advantages of the automated validation method to this type of implementation are many. To start, individual validations are tracked individually by employee and unique part in an automatic fashion. This confers many benefits on the validation process. A reduction in labor, reduction of record keeping materials, and improvement in overall efficiency is realized because all record keeping of validation results are completed automatically. The stored information is accessible by any criteria, allowing for simple analysis of the potential extent of a quality problem in the event that a non-conforming part is not properly identified by the validation process. This is quite useful in an application such as end of line validation, as that type of process is typically very repetitive and routine. Consequently, having information readily available makes it much easier to pinpoint the potential failure in the validation process and it allows the failure mode to be corrected quickly in order to prevent any future failures. In addition, the quick determination of the extent of a quality problem can allow business managers to make better informed decisions, reducing the financial and reputational negative impact a validation failure may have on a manufacturing enterprise. Third, production management will be able to more quickly address quality problems upstream in the manufacturing process with real-time reports based upon the data collected. In addition, any potential part non-conformances can be added to the validation path at end of line quickly and easily, allowing for validation items to be added to the automatic validation process in a matter of minutes.

The second area of use is in third party part validation. Many customers may require their suppliers to hire the skills of a third party company to independently validate the quality of parts being sent to the customer. The present invention has the ability to both facilitate the third party operations when required, and can also prevent the need for a third party validation when the system is used internally at the supplier at various areas, including end of line, in process, and for offline inspection. When used for third party validation, the validation system will be configured similarly to the end of line application, except validation items will be entered only for items required to be validated by the customer and supplier. The benefits of the validation system in this situation are threefold. First, the third party performing the validation is often required to provide inspection reporting on the validation results on a regular and timely basis to both the supplier and customer. The automated nature of the validation system's data collection allows for quick and easy generation of reports from the third party's validation records, resulting in a cost savings for both the supplier and customer. Second, the limited list of validation items in the third party validation system can prevent extraneous validation activities, and will prevent inadvertent disclosure of unrelated non-conformances to the customer. This provides cost savings due to greater efficiency in validation and also limits a supplier's financial and reputational exposure by disclosure of additional non-conformances to a customer, enabling the supplier to control the validation and correction of other potential non-conformances internally. Third, if a non-conforming part does reach the customer, the validation system used by the third party can confirm whether the validation process was followed for the non-conforming part, and if so, may limit the financial impact on the supplier.

The third area of use is in offline inspection/validation. This process is used when a specific group of parts must be validated once packed into containers, for example in the instance when rework has been performed, or if a non-conformance has been detected at the customer and packed parts must be validated or re-validated to ensure that the specific non-conformance does not exist on any of the parts specified. In these situations, the validation system provides many benefits. First, the created validation item will specifically identify the exact validation instructions that must be followed, which will reinforce the process that must be followed, which can be critical for processes that are typically very short in duration. Second, results from an offline inspection/validation are typically required immediately upon completion of the validation on all specified parts. Using the validation system, these reports can be quickly generated minutes after completion of the validation process. Third, by automatically recording validation information and controlling the packout of conforming parts into outgoing containers, the system greatly reduces the potential of mixed goods in the validated containers.

The second type of process is the continuous validation of parts with the packout feature disabled. This process is typically used inside of the manufacturing process, before the part is fully completed. This is typically termed as an in process inspection or self-inspection. The implementation of the validation method in this manner would likely include a series of validation workstations throughout the manufacturing assembly line, validating items immediately after the part may become potentially non-conforming. The advantage of doing so is that any non-conforming part is detected earlier in the manufacturing process and the failure mode creating the non-conformance can be corrected much more quickly, with less non-conforming parts produced. The advantage of using the validation method in this situation is twofold. First, the disposition of a part as non-conforming at a self-inspection station can be reported to the responsible personnel immediately, as the information is being recorded automatically by the validation system. Second, if a non-conforming product is discovered later on in the manufacturing process or at the customer, the validation system information will facilitate an investigation into the failure of the validation process.

As described above, the present version of the validation method invention has many advantages and uses. In comparison with present systems, which include paper based data collection and computerized discrete data collecting and analysis tools, it is a complete and encompassing system that controls, facilitates, and informs upon a successful validation process. Unlike previous systems, this invention makes available validation information on a real-time basis. Previous systems required manual compilation of information (in the case of paper based data collection), and aggregation of discrete data sources (in the case of computerized data collection and analysis tools). No other system currently known has the ability to allow quality personnel to dynamically create a validation path that must be performed on a part, display the required validations in real-time to a validation employee, and store all validation information collected (associated by part and employee). By displaying the correct validations that must be performed for every part processed and by automatically collecting data, the validation method reduces process and data collection errors significantly. Overall, these advantages can translate into significant financial, productivity, and reputational gains for a enterprise fully using its features.

Having fully described several embodiments of the present invention, many other equivalent or alternative methods of implementing this quality validation method will be apparent to those of skill in the art. These alternatives and equivalents are intended to be included within the scope of the invention, as defined by the following claims.

What is claimed is:

1. A computerized method capable of facilitating a validation process utilizing one or more computerized servers and one or more computerized validation workstations comprising:

storing a part identifier for each of a plurality of parts in a database on the one or more computerized servers;

storing an item identifier for each of a plurality of validation items in a database on the one or more computerized servers, wherein each validation item includes validation instructions for visually inspecting a pre-existing characteristic of at least one of the plurality of parts, an image of an example conforming part, an image of an example non-conforming part, and an indication of whether results associated with the validation item is to be reported to a customer;

storing a path identifier for each of one or more validation paths in a database on the one or more computerized servers, each validation path comprising one or more validation items in a particular order, and wherein each validation path is associated with at least one of the plurality of parts;

identifying a current part to be validated at an inspection workstation based on input received from the inspection workstation;

selecting a validation path to be used to validate the current part based on the at least one part associated with the selected validation path;

generating a list of validations to be displayed on the inspection workstation including all validation items in the selected validation path;

generating information describing a current validation item selected from the generated list of validations for display on the at least one inspection workstation, wherein the information for display includes validation instructions, an image of a conforming part, and an image of a non-conforming part;

receiving input from the inspection workstation indicating the results of a validation item based on a visual inspection of the current part;

storing a record of information including a processed part identifier describing the current part in a database;

storing a record of information including the processed part identifier and the results of the current validation item in a database;

completing the validation of a part as passed once input has been received for all validation items of the selected validation path that indicates conformance; and completing the validation of a part as failed once input has been received for a validation item that indicates non-conformance.

2. The method of claim 1, additionally comprising storing an identifier and a password describing one or more employees in a database;

authenticating the user of each validation workstation utilizing user input and the stored employee information;
associating the employee identifier with the processed part identifier.

3. The method of claim 1, additionally comprising
receiving input describing a current container comprising part number, serial number, and quantity;
storing an identifier for the current container in a database;
validating that the current part matches the part number indicated by the container;
counting a quantity of parts that pass all validation items, that have not been associated with a container, and that have the same part identifier;
associating each of the counted parts with the identifier of the current container;
completing the current container when the quantity of validated parts matches the quantity indicated by the container.

4. The method of claim 3, wherein identifying the current part includes verifying that the current part matches the part number of the current container.

5. The method of claim 1, additionally comprising
receiving initialization request from a newly installed validation workstation;
generating a unique identifier;
assigning the unique identifier to the newly installed validation workstation in a database;
configuring a validation workstation description for the newly installed validation workstation including an association with at least one of the plurality of validation paths;
running the newly installed validation workstation based on the description stored in the database.

6. The method of claim 1, additionally comprising
storing an identifier describing an area of the part to be validated; and
associating one or more validation items with the validation area;
wherein selection and display of validation items are grouped by validation area.

7. The method of claim 1, additionally comprising
storing a change revision indicator associated with each of the validation paths;
associating the current change revision indicator to the stored data of the processed part;
associating the current change revision indicator to the stored data of the validation item results;
incrementing the change revision indicator associated to a validation path upon an update or change of the validation path description or associated validation item description or part description; and
storing at least the changed description of the validation path and associated validation items and parts for each change revision.

8. The method of claim 1, wherein the result of a validation item is obtained automatically via connection with an external data source.

9. The method of claim 1, wherein the results include variable data, the method additionally comprising:
storing information describing criteria associated with each validation item utilized to evaluate variable data; and
determining whether the validation item passed or failed based upon stored criteria and result received.

10. The method of claim 1, wherein the current validation item has a plurality of associated non-conforming images, the results of the current validation item indicate that the current part is non-conforming, and the results include an indication of a non-conformance classification that is selected by a user by comparing the current part with at least some of the non-conforming images.

11. The method of claim 1, further comprising:
generating a report of aggregated validation results including only validation items that are to be reported to a customer;
sending the generated report to the customer.

12. A quality validation system operable to facilitate the visual inspection of a plurality of produced parts, the system comprising:
at least one computer server and at least one computer workstation connected by a network and collectively operable to:
receive and store information associated with a plurality of parts, validation items, and validation paths,
wherein at least one of the plurality of parts is associated with at least one part number,
wherein at least one of the plurality of validation items is associated with at least one of the plurality of parts and includes validation instructions for a visual inspection of a feature of the associated at least one part, at least one image of a conforming feature, at least one image of a non-conforming feature, and an indication of whether results associated with the validation item is to be reported to a customer, and
wherein at least one of the plurality of validation paths includes a subset of the plurality of validation items arranged in a pre-defined order;
(A) receive a selection of a current produced part to be validated, wherein the selection includes an indication of a part number;
(B) select a validation path of validation items based on the selection of the current part and generate at least a portion of a screen for displaying validation path information on a computer workstation including a listing of the validation items in the validation path arranged in the pre-defined order;
(C) select a current validation item of the subset of validation items associated with the selected validation path selected based on the pre-defined order of validation items and generate at least a portion of a screen for displaying validation item information on the computer workstation including at least one image of at least one conforming feature; at least one image of at least one non-conforming feature, and the validation instructions for visual inspection associated with the current validation item;
(D) receive and store a result of the current validation item for the current produced part from a user of a computer workstation based on a visual inspection conducted based on the displayed screen of validation item information, wherein the result includes an indication that the current validation item feature of the current produced part is either conforming or non-conforming; and
(E) repeat steps (C) and (D) until either a result is received and stored for each of the subset of validation items or a result is received that indicates that a feature of the current produced part is non-conforming.

13. The quality validation system of claim 12, wherein the at least one computer server and the at least one computer workstation connected by a network are further collectively operable to:
receive and store information associated with a current container for storing produced parts having only conforming features, wherein the container information includes at least a part number, quantity, and serial number;

repeat steps (A)-(E) until a number of conforming produced parts are validated that is equal to the quantity associated with the current container; and periodically generate at least a portion of a screen for displaying container status information on the computer workstation including a list of conforming produced parts that are associated with the current container.

14. The quality validation system of claim 12, wherein the at least one computer server and the at least one computer workstation connected by a network are further collectively operable to:

automatically aggregate results stored for a plurality of produced parts received from a plurality of computer workstations based on at least one of part number, date, and validation item; and generate a report including at least one of a pareto analysis graph and a PPM trend chart.

15. The quality validation system of claim 12, wherein the at least one computer server and the at least one computer workstation connected by a network are further collectively operable to:

generate a report of aggregated validation results including only validation items that are to be reported to a customer;

send the generated report to the customer.

16. The quality validation system of claim 12, wherein the information associated with the at least one of the validation items includes at least one of a start date and an end date and wherein the operation to select a current validation item includes selecting a validation item having a start date before a current date or an end date after the current date.

17. A non-transitory computer readable medium including instructions for a quality validation system operable to facilitate the visual inspection of a plurality of produced parts, the instructions configured to be performed by at least one computer server and at least one computer workstation connected by a network and being collectively operable to:

receive and store information associated with a plurality of parts, validation items, and validation paths, wherein at least one of the plurality of parts is associated with at least one part number, wherein at least one of the plurality of validation items is associated with at least one of the plurality of parts and includes validation instructions for a visual inspection of a feature of the associated at least one part, at least one image of a conforming feature, at least one image of a non-conforming feature, and an indication of whether results associated with the validation item is to be reported to a customer, and wherein at least one of the plurality of validation paths includes a subset of the plurality of validation items arranged in a pre-defined order;

(A) receive a selection of a current produced part to be validated, wherein the selection includes an indication of a part number;

(B) select a validation path of validation items based on the selection of the current part and generate at least a portion of a screen for displaying validation path information on a computer workstation including a listing of the validation items in the validation path arranged in the pre-defined order;

(C) select a current validation item of the subset of validation items associated with the selected validation path selected based on the pre-defined order of validation items and generate at least a portion of a screen for displaying validation item information on the computer workstation including at least one image of at least one conforming feature; at least one image of at least one non-conforming feature, and the validation instructions for visual inspection associated with the current validation item;

(D) receive and store a result of the current validation item for the current produced part from a user of a computer workstation based on a visual inspection conducted based on the displayed screen of validation item information, wherein the result includes an indication that the current validation item feature of the current produced part is either conforming or non-conforming; and (E) repeat steps (C) and (D) until either a result is received and stored for each of the subset of validation items or a result is received that indicates that a feature of the current produced part is non-conforming.

18. The non-transitory computer readable medium of claim 17, further including instructions to:

receive and store information associated with a current container for storing produced parts having only conforming features, wherein the container information includes at least a part number, quantity, and serial number;

perform steps (A)-(E) until a number of conforming produced parts are validated that is equal to the quantity associated with the current container; and periodically generate at least a portion of a screen for displaying container status information on the computer workstation including a list of conforming produced parts that are associated with the current container.

19. The non-transitory computer readable medium of claim 17, further including instructions to:

automatically aggregate results stored for a plurality of produced parts received from a plurality of computer workstations based on at least one of part number, date, and validation item; and generate a report including at least one of a pareto analysis graph and a PPM trend chart.

20. The non-transitory computer readable medium of claim 17, further including instructions to:

generate a report of aggregated validation results including only validation items that are to be reported to a customer;

send the generated report to the customer.

* * * * *